Aug. 4, 1959   J. C. WINSLOW   2,897,695
DRILL COUNTERSINK BIT
Filed Feb. 24, 1959
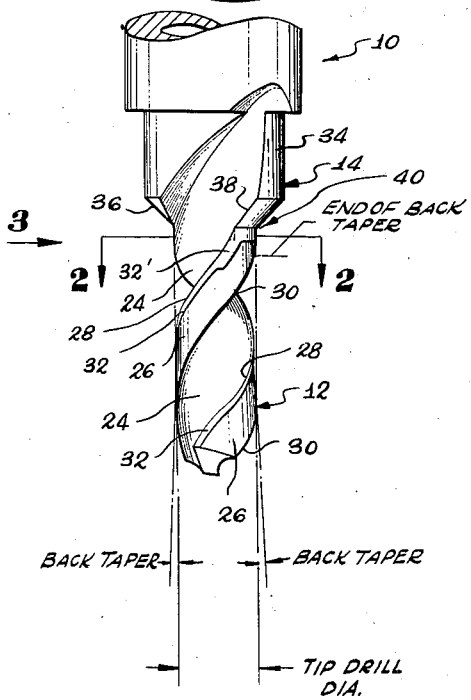
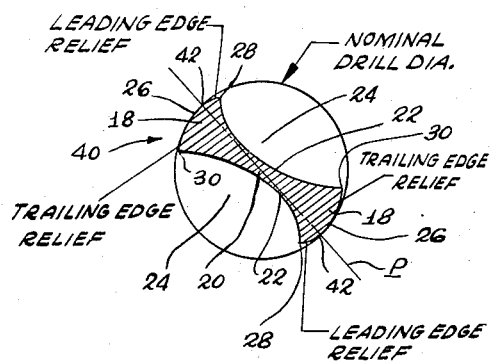
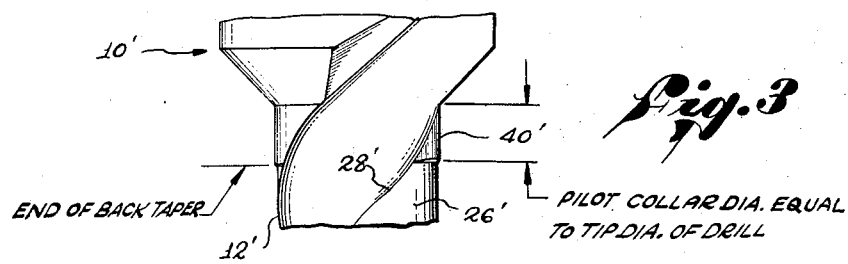
INVENTOR.
JAMES C. WINSLOW
BY
Forrest J. Lilly
Attorney

United States Patent Office 2,897,695
Patented Aug. 4, 1959

2,897,695

DRILL COUNTERSINK BIT

James C. Winslow, Sierra Madre, Calif.

Application February 24, 1959, Serial No. 794,958

7 Claims. (Cl. 77—66)

This invention deals generally with drill bits, and more particularly with an improved combination drill bit.

Briefly stated, a combination drill bit is one having a forward fluted drill body such as a twist drill body for boring a hole of given diameter in a workpiece and a rear enlarged cutter for recessing the end of the bore. The rear cutter may comprise, for example, a countersink or counterbore cutter.

As is well known in the art, there is a tendency for so-called "cladding" to occur when drilling certain types of material, such as aluminum and other soft metals. "Clad" not only results in the wall of the bore having a rough and uneven surface, but also creates forces which cause the drill bit to cut oversize.

In order to avoid "cladding" and achieve a smoother, more accurate bore, drill bits are often "back tapered." As is well known, a back tapered drill bit is one which has a given diameter at its tip end and tapers to a smaller diameter at its rear end.

It was found that when the twist drill body of a combined drill bit was back tapered in this way, there was a tendency for chattering to occur upon engagement of its rear enlarged cutter with the work because of the slight clearance between the rear end of the body and the wall of the bore. As a result, the recess produced by the cutter was inaccurate and had an extremely rough surface.

A broad object of the present invention is to provide a combination drill bit, having a back tapered twist drill body, which avoids the above-noted and other defects.

A more specific object of the invention is to provide a back tapered, combination drill bit of the character described wherein the rear end of the back tapered twist drill body is radially enlarged to the same diameter as the tip end of the body so as to form a pilot section for the rear cutter which eliminates chattering of the rear cutter.

Another object of the invention is to provide a back tapered combination drill bit of the character described wherein the pilot section is relieved in such a way as to preclude the latter from counterboring the work.

A further object of the invention is to provide a back tapered combination drill bit of the character described which is effective in use, relatively inexpensive to manufacture, and otherwise ideally suited to its intended purpose.

Other objects, advantages and features of the invention will become apparent as the description proceeds.

The invention will be best understood from the following detailed description taken in connection with the annexed drawings, wherein:

Fig. 1 illustrates one form of the present drill bit;

Fig. 2 is an enlarged section taken along line 2—2 of Fig. 1; and

Fig. 3 illustrates a portion of a modified form of the present bit.

The combination bit 10 of Figs. 1 and 2 has a forward twist drill section or body 12, an intermediate enlarged cutter 14 at the rear end of the twist drill body, and a rear shank 16 for attachment to a rotary power tool. Cutter 14 has been illustrated as comprising a countersink cutter for countersinking the end of the bore formed in a workpiece by the twist drill body 12. It will become apparent as the description proceeds, however, that insofar as the present invention is concerned, cutter 14 might be other than a countersink cutter, such as a counterbore cutter, for example.

The forward twist drill body 12 comprises, in the usual way, a pair of diametrically opposed helical ribs 18 which are integrally joined by a central helical web 20. The curved side walls 22 of the ribs 18 and web 20 define a pair of diametrically opposed helical flutes 24 that extend the full length of the twist drill body 12 and into the body of the countersink cutter 14. The helical, cylindrically curved outer surfaces 26 of the ribs 18 are commonly referred to as lands. It will be appreciated as the description proceeds that the forward twist drill body may have more than two flutes, as shown.

In use, the bit 10 is rotated in a clockwise direction, as viewed in Fig. 2. With respect to this direction of rotation, each land 26 has a helical leading edge 28 and a helical trailing edge 30. The leading edges 28 form helical cutting edges on the twist drill body.

In order to obtain a superior cutting action, trailing portions of the lands of twist drills are commonly relieved in such a way as to leave a raised margin along the leading edge of each land. The lands of the bit 10 have been relieved in this way, the margins formed thereby being indicated at 32.

The countersink cutter 14 comprises, in the conventional manner, a cylindrical body 34 having a forward conical surface 36 which tapers inwardly in the forward direction of the bit and terminates at the rear end of the twist drill body 12. The trailing intersection of each flute wall 22 with the conical surface 36 forms an inclined, countersink cutting edge 38. Only one of these countersink cutting edges 38 is visible in the drawing, the other cutting edge being located on the diametrically opposite side of the cutter.

The combined drill bit thus far described is essentially conventional and is used in the customary way to drill and countersink a hole in a single operation.

As is well known in the art, there is a tendency for so-called "cladding" to occur when drilling in certain soft metals, such as aluminum. When such cladding occurs, a metal clad is deposited on both the wall of the drilled hole and the surface of the drill. This clad produces a rough and inaccurate hole, imposes an excessive drag on the drill, results in the generation of excessive heat, and appreciably shortens the life of the drill.

Cladding is commonly minimized or eliminated by back tapering the drill bit. It is for this reason that the twist drill body 12 of the present combined drill bit 10 is back tapered, as shown, from a given nominal diameter at its forward or tip end to a slightly smaller diameter adjacent its rear end. In this way, most of the cutting is done by the tip end of the twist drill body. The rear portion of the body is spaced slightly from the wall of the drilled hole so as to avoid wiping of the rear portion of the body against the wall, which wiping gives rise to the undesirable cladding effect.

It was found, however, that when the forward twist drill body of a combined drill bit was back tapered in this way, the bit was prone to excessive vibration or chatter upon engagement of the rear cutter 14 with the work. This chatter, which resulted in an extremely rough and inaccurate cut, was apparently due to the clearance which existed between the rear end of the back tapered twist drill body and the wall of the drill hole and which permitted or gave rise to vibration or chatter of the rear end of the twist drill body and the enlarged cutter at the rear thereof.

In accordance with the present invention, this chattering of the bit is avoided by enlarging the rear end of the back tapered twist drill body to full diameter of its tip end so as to provide a pilot section for the rear enlarged cutter. Thus, referring to Figs. 1 and 2 of the drawings, it will be seen that a rear end portion 40 of the twist drill body 12, or more accurately, rear end portions of the lands 26, are radially enlarged to the given nominal diameter of the tip end of the twist drill body.

This rear enlarged portion 40, hereinafter referred to as a pilot section, engages in the hole drilled by the twist drill body 12 just prior to engagement of cutter 14 with the work. Because of the close fit of the pilot section in the drilled hole, the bit, and more especially the cutter 14, are restrained against vibration or chattering when the latter cutter engages the work.

It will be apparent that the enlarged pilot section 40, as described thus far, forms, in effect, a counterbore cutter which would tend to slightly counterbore the hole drilled by the tip of the twist drill body if steps were not taken to avoid such counterboring action. To this end, the pilot section 40 is enlarged to the full diameter of the tip end of the twist drill body only in a plane P passing through the axis of the bit and intersecting the rear ends of the lands 26, comprising pilot section 40, intermediate their leading and trailing edges 28 and 30 but closely adjacent to the rear ends of the leading edges, as shown most clearly in Fig. 2. The leading and trailing portions of each land, within the pilot section, are arcuately relieved in the manner illustrated in Fig. 2 so as to eliminate any possibility of the rear end of the helical cutting edge 28, within the pilot section, counterboring the drilled hole, as mentioned above. The margins 32 are widened somewhat within the pilot section, as indicated at 32', to permit relieving of the leading portions of the lands in the manner just described without excessively thinning the margins or shortening the pilot section.

In use of the present combined drill bit, therefore, the back tapered twist drill body 12 penetrates the work first and drills a hole having a diameter equal to nominal diameter of the enlarged tip end of the body. Just prior to engagement of the rear enlarged cutter 14 with the work, the pilot section engages in the drilled hole and contacts the wall of the latter at its diametrically opposite full diameter zones 42 to restrain the bit against chattering upon subsequent engagement of cutter 14 with the work. A smoother, more accurate cut is thereby produced by the cutter.

As mentioned earlier, while the cutter 14 has been illustrated as a countersink cutter, it may as well be a counterbore cutter since the problem of chattering would exist in a back tapered, combination drill-counterbore bit as well as in the illustrated combined drill-countersink bit.

It will be appreciated that the present invention may be applied as well to a back tapered combined drill bit 10' (Fig. 3) in which the lands 26' of the twist drill body are not relieved to provide a margin along their leading edges 28'. As before, the portions of the lands comprising the pilot section 40' at the rear of the back tapered twist drill body 12' are relieved at the leading and trailing sides of the plane in which the section is enlarged to the full diameter of the tip end of the twist drill body to avoid the counterboring action previously described.

Numerous other modifications are, of course, possible within the spirit and scope of the following claims.

I claim:

1. A combination drill bit comprising a forward fluted drill body which has a given diameter at its tip end and is back tapered to a smaller diameter adjacent its rear end, a rotary cutter at the rear end of said body having a larger diameter than the body, and the rear end of said body being radially enlarged to said given diameter to form a pilot section for said cutter.

2. A combination drill bit comprising a forward fluted drill body which has a given diameter at its tip end and is back tapered to a smaller diameter adjacent its rear end, a rotary cutter at the rear end of said body having a larger diameter than the body, the rear end of said body being radially enlarged to form a pilot section for said cutter, said pilot section having said given diameter in a given axial plane of the body and being relieved at opposite sides of said plane.

3. A combination drill bit comprising a forward twist drill body having diametrically opposed helical ribs interconnected by a web and diametrically opposed helical flutes which extend the full length of said body, said body having a given diameter, measured diametrically across said ribs, at its tip end and being back tapered to a smaller diameter adjacent its rear end, a rotary cutter at the rear end of said body having a larger diameter than the body, and the rear end of said body being radially enlarged to said given diameter to form a pilot section for said cutter.

4. A combination drill bit comprising a forward twist drill body having diametrically opposed helical ribs interconnected by a web and diametrically opposed helical flutes which extend the full length of said body, said bit being rotatable in a given direction on its axis during use and the outer surface of each rib forming a helical land having a helical leading edge and a helical trailing edge with respect to said direction of rotation, said body having a given diameter, measured diametrically across said ribs, at its tip end and being back tapered to a smaller diameter adjacent its rear end, a rotary cutter at the rear end of said body having a larger diameter than the body, the rear end portions of said ribs being radially enlarged to said given diameter in an axial plane of the body intersecting the rear ends of said lands intermediate the rear ends of their leading and trailing edges to form a pilot section for said cutter, and the portion of each land comprising said pilot section being relieved at the leading and trailing sides of said plane.

5. A combination drill bit comprising a forward fluted drill body which has a given diameter at its tip end and is back tapered to a smaller diameter adjacent its rear end, a countersink cutter at the rear end of said body, and the rear end of said body being radially enlarged to said given diameter to form a pilot section for said cutter.

6. A combination drill bit comprising a forward twist drill body having diametrically opposed, helical ribs interconnected by a web and diametrically opposed helical flutes which extend the full length of said body, said bit being rotatable in a given direction on its axis during use and the outer surface of each rib forming a helical land having a helical leading edge and a helical trailing edge with respect to said direction of rotation, said body having a given diameter, measured diametrically across said ribs, at its tip end and being back tapered to a smaller diameter adjacent its rear end, a countersink cutter at the rear end of said body, the rear end portions of said ribs being radially enlarged to said given diameter in an axial plane of the body intersecting the rear ends of said lands intermediate the rear ends of their leading and trailing edges to form a pilot section for said cutter, and the portion of each land comprising said pilot section being relieved at the leading and trailing side of said plane.

7. The subject matter of claim 4 wherein each land has a margin along its leading edge extending from the tip end of said body to and merging with said pilot section.

No references cited.